E. E. NORMAN.
AUTOMATIC FEED WATER DEVICE FOR STEAM BOILERS.
APPLICATION FILED AUG. 20, 1908.
979,546.
Patented Dec. 27, 1910.
2 SHEETS—SHEET 1.
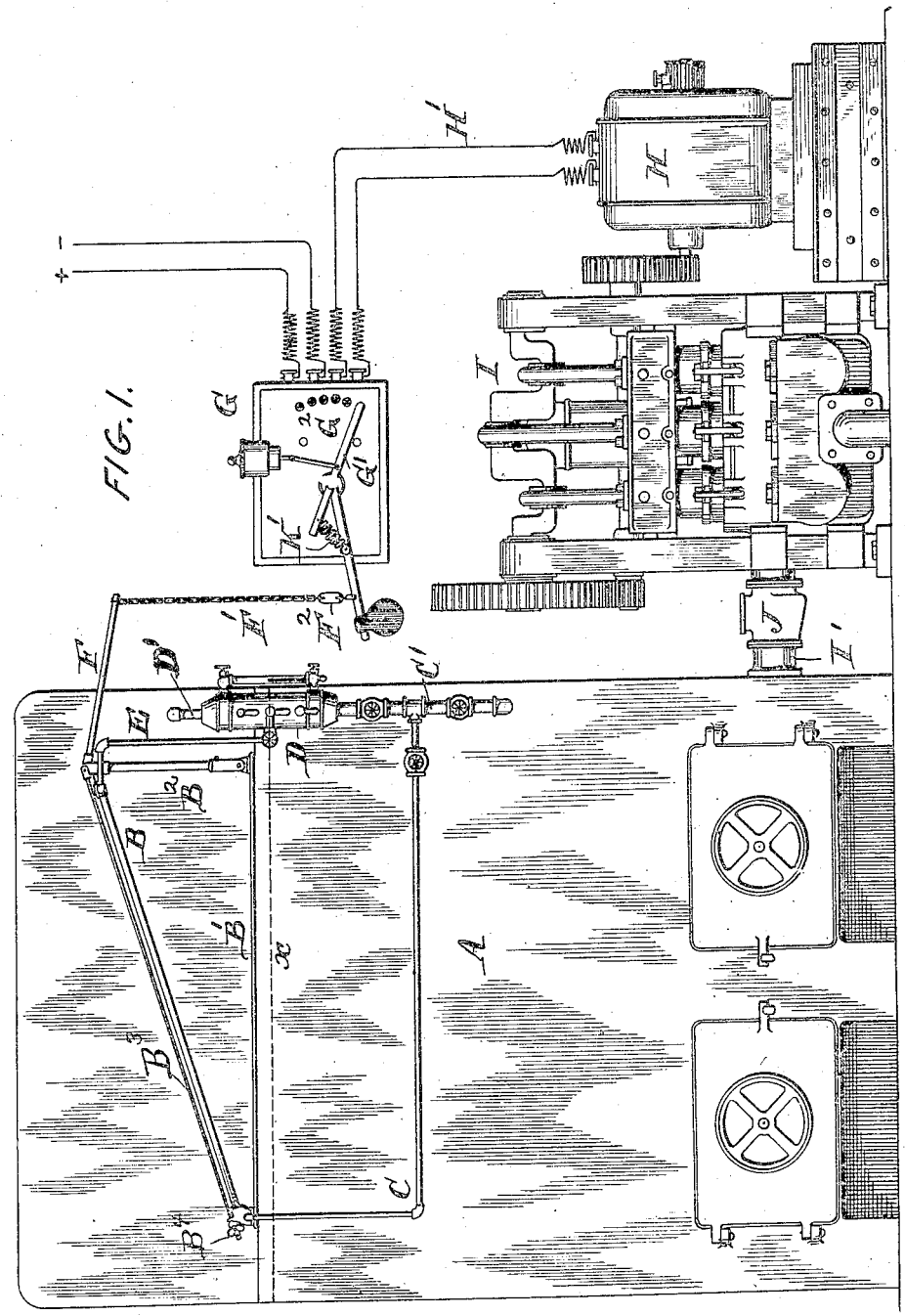

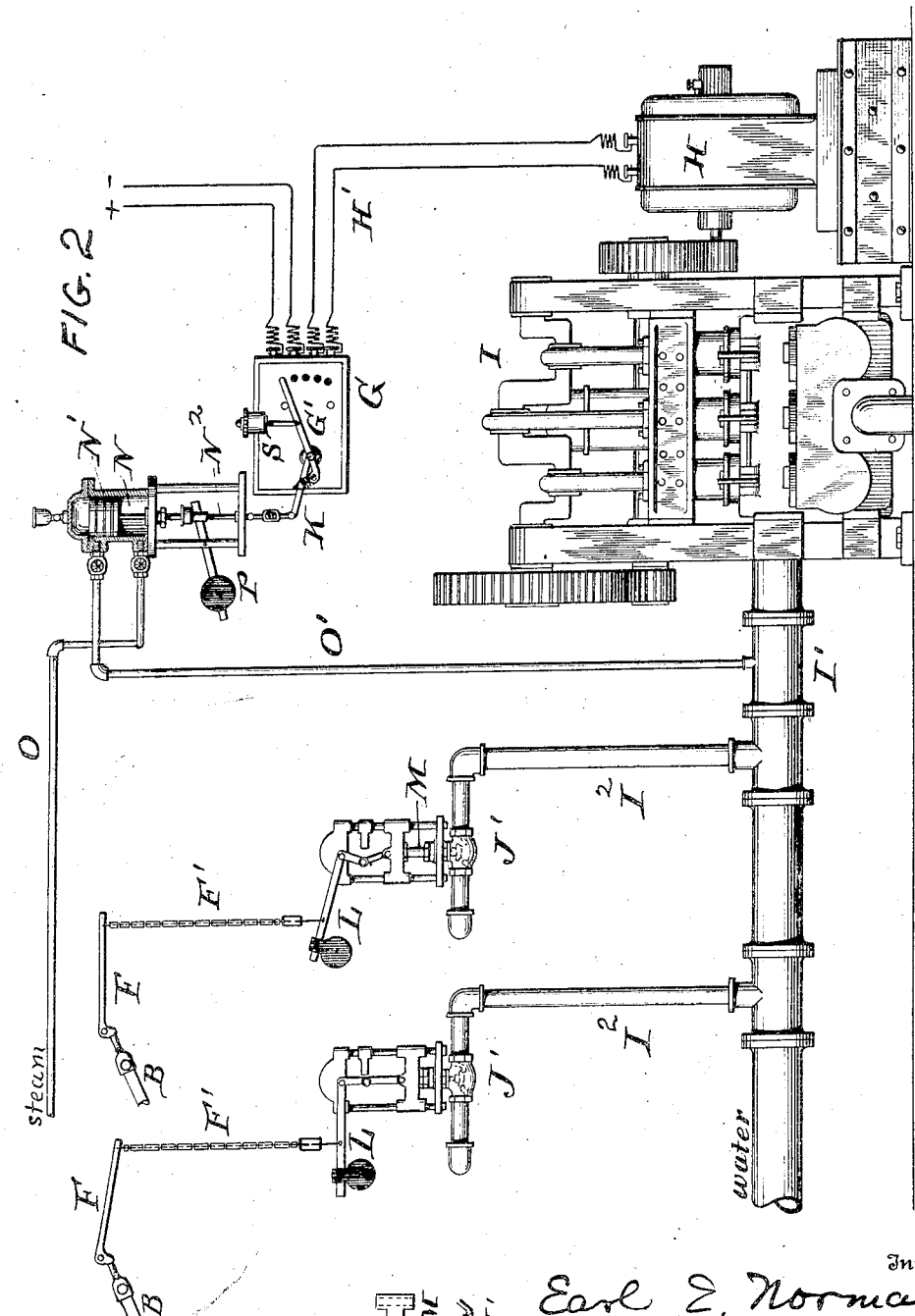

UNITED STATES PATENT OFFICE.

EARL E. NORMAN, OF PHILADELPHIA, PENNSYLVANIA, ASSIGNOR, BY MESNE ASSIGNMENTS, TO NORTHERN EQUIPMENT COMPANY, OF CHICAGO, ILLINOIS, A CORPORATION OF ILLINOIS.

AUTOMATIC FEED-WATER DEVICE FOR STEAM-BOILERS.

979,546.  Specification of Letters Patent.  Patented Dec. 27, 1910.

Application filed August 20, 1908. Serial No. 449,391.

*To all whom it may concern:*

Be it known that I, EARL E. NORMAN, a citizen of the United States, and a resident of the city and county of Philadelphia and State of Pennsylvania, have invented an Improvement in Automatic Feed-Water Devices for Steam-Boilers, of which the following is a specification.

My invention has reference to automatic feed water devices for steam boilers, and consists of certain improvements which are fully set forth in the following specification and shown in the accompanying drawings which form part thereof.

The object of my invention is to provide automatic means for maintaining a substantially constant water level in a boiler or battery of boilers, and more particularly, the said means to be electrically operated so far as the delivery of the water into the boiler or boilers is concerned and thermally controlled due to the conditions existing within the boiler or boilers.

My invention comprises the combination with one or more boilers, of a pump, an electro-motor for intermittently operating the pump, an electrical controller for controlling the operation of the electro-motor, and thermally actuated means controlled by the water level within the boiler for regulating the time of operation of the electrical controller, whereby the motor may be put into operation automatically whenever the water level in the boiler comes below the predetermined normal level.

My invention, more specifically, embodies a battery of boilers, combined with a pump, an electro-motor to operate the pump, a water main into which the pump delivers water under pressure, separate branch feed pipes to each boiler from the water main, a check valve in each branch pipe to prevent water passing from the boilers into the water main, power devices for assisting the boiler pressures of the respective boilers to hold their check valves closed against the superior pressure in the water main, devices for each boiler and controlled by the water level therein for respectively controlling the several power devices, an electrical controller for controlling the operation of the electro-motor, and means operated by the differential in pressures between the boiler or boilers and the water main for operating the electrical controller to put the pump into operation whenever the water level of any one or more of the boilers becomes lower than the predetermined normal levels.

My invention also comprehends various features and details of construction which, together with those above specified, will be better understood by reference to the drawings in which:

Figure 1 is a general elevation illustrating my invention when applied to a single boiler; Fig. 2 is an elevation showing my invention adapted for a battery of boilers, the boilers and thermo controllers not being shown but understood to be as indicated in Fig. 1; and Fig. 3 is an elevation of a detail of the supply valve for the feed water pipe.

Referring more particularly to Fig. 1, A is the boiler and may be of any construction desired. D is the usual water column which is provided with the gage cocks and water glass and has its top connected with the boiler above the water level by pipe D' and also below the water level by pipe C'. The normal water level is represented by the dotted line $x$ and is in line with the middle gage cock. I is the boiler feed pump and delivers water under pressure to the boiler by pipe I' having check valve J. These parts may be of any desired construction. The pump I is shown as a power driven geared pump and is operated intermittently by an electro-motor H receiving current by conductors H' and controlled by an electric controller G which, together with the motor, may be of any desired construction. The controller shown as an example has a series of resistances having terminals $G^2$ over which the cut out switch G' travels, the latter being moved by a quick acting spring K' under the influence of a weighted lever K. A dash pot S may be used to make the switch move slowly over the contacts when supplying the current to the motor. I do not make claim to any feature of the switch *per se*, as there are many types of switches on the market which may be used for the purposes of my invention. B is an expansion tube and is preferably arranged at an incline with its lower end secured to a base B'. The upper end of this expansion tube is jointed to the short arm of a bell crank F which is pivoted on the upper end of a standard $B^2$ secured to the base. $B^3$ is a tension rod extending parallel with the expansion tube and connected at one end with the base and at the other end with the top of the standard by the pivot of the bell crank. The bottom end of the expansion tube B is connected by a pipe C with the pipe C' considerably below the normal water level $x$ of the boiler, and the upper end of the expansion tube is connected by a pipe E with the water column D at a point in line with the normal water level $x$ of the boiler and hence adjacent to the middle gage cock $d$. The free end of the long arm of the bell crank F is connected by a chain F' with the operating weighted lever K of the electrical controller G. This chain is preferably provided with a turn-buckle $F^2$ for purposes of adjustment. Adjustment may also be made by the tension rod $B^3$ and the nut $B^4$ at the lower end. By these means the parts may be so arranged that whenever the water level lowers slightly, the controller G will be put into operation to start the pump and vice versa. The expansion tube B is preferably above the water level $x$ of the boiler, as shown, but may be arranged in any other manner desired so long as the lever F is operated by any change of water level.

The operation is as follows: Assuming the water level to be normal, the pump will be at rest and the parts in the positions shown. In this condition expansion tube B is sealed at both ends and is full of water and hence in contracted condition. If now, the water level becomes lowered so as to allow steam to enter pipe E, we will then have the water in pipe B caused to flow through pipe C into the boiler and allow the steam to fill said pipe B. The result of this is, that the pipe heats up and expands and by said action causes the free end of the bell crank lever F to rise, and by the chain F' lift the weighted lever K. When the lever K is sufficiently lifted, it puts into operation the switch lever G' which starts the electro-motor H. The pump is then put into action and as the water rises in the boiler to the normal level, the pipe E is again sealed with the result that the steam in the expansion tube B is condensed and the tube filled with water. The tube then contracts and lowers the chain F', and the weighted lever K of the controller G swings slowly downward until a point is reached when the switch lever G' is operated to shut off the current and stop the motor and pump. These operations may be made to take place for very slight variations in the water level in the boiler as it is only a matter of proportioning the movement of the several parts to secure any sensitiveness desired.

As large manufacturing plants usually employ two or more boilers as a battery of steam generators, it becomes necessary to somewhat modify my invention when employed for such battery of boilers, for in such case we have only one boiler feed pump and this must respond to the demands of any one of the series of boilers; and moreover, the mechanism of the boiler requiring the water supply must so direct the water that it is delivered to the proper boiler. Means for accomplishing the above requirements is shown in Fig. 2. I is the feed water pump and delivers water into a high pressure water main I' at a higher pressure than that of the boilers. This pump I is driven by an electro-motor H as before, and the current to the motor is supplied by suitable circuits H' and controlled by the electrical controller G which may be of the same general construction as in Fig. 1. Instead of the lever K of the controller being directly operated by the expansion tube it is operated by a rod $N^2$ which is depressed by a weighted pivoted arm P and is raised by a piston N' working in a cylinder N. The piston is depressed by the pressure of the water in the main I' exerted through a pipe O' connecting with the upper end of cylinder N, and is raised by the pressure of the steam from the boilers delivered by pipe O connecting with the bottom of cylinder N and assisted by the weighted pivoted arm P. The normal pressure in the main I' is sufficient to hold the piston in its lowered position. Pipes $I^2$ are branches which lead from the main I' and deliver feed water to the respective boilers (not shown), and these branch feed water pipes are each provided with a check valve J' to prevent water flowing from the boilers at all times and to prevent the water from passing into the boilers except when the water level is too low. Each check valve is provided with a plunger M which may be raised or lowered by a toggle lever mechanism L weighted at L' to close the check valve against the pressure of the pump. The toggle lever construction is such as to lock the valve closed when the weight L' is given opportunity to exert its influence. Each boiler is provided with an expansion tube B as shown in Fig. 1 and as indicated by the upper end of such tubes, in Fig. 2, and said expansion tubes operate the bell crank levers F and these through the chains F' operate the weighted toggle levers L, raising them when the water is too low in the boiler, and vice versa. In Fig. 2, provision is shown for supplying water to two boilers and the right hand check valve is in open position for feeding water from main I' through pipe $I^2$ to the boiler. When this operation is taking place the pressure in main I' is lower than normal and consequently the steam pressure assisted by the weighted pivoted arm P has operated the switch of the controller G and the motor H is in act of driving the pump. When the water level in the boiler being supplied rises to the normal, the lever L is lowered and the weight L' assisted by the boiler pressure stops the flow of water through the check valve. The pressure in the main I' then increases and this extends to the cylinder N above the piston N', with the result that the piston is lowered and operates the controller G to stop the motor H. While in this instance the controller is directly controlled by the steam and water pressure, it is nevertheless indirectly controlled by the expansion tubes and the water level in the boilers.

The apparatus herein described will maintain a predetermined water level and because of the accuracy of its operation it increases the life, safety and efficiency of power plants, and among other advantages secures the following, namely: High or low water is prevented, thereby reducing danger from burning of sheets and tubes on the one hand, and from water passing over with the steam on the other; drier steam which promotes efficiency and diminishes wear and danger of accidents in engine cylinders and turbines; the rate of inflow of feed is practically equal to the rate of evaporation, hence the slow, even passage of water through economizers or heaters, when used, permits such heating apparatus to impart a greater amount of heat to the water, since the water is able to absorb the heat continuously as it is delivered, and this increases steam plant economy and saves coal; strains resulting from masses of cold water injected into boilers at irregular intervals are prevented; and steam pressure may be maintained more even and a more uniform system of firing made possible.

I have described my invention in the form in which I prefer it for commercial use but it is to be understood that I do not confine myself to the details of construction as these may be modified in various ways without departing from the spirit of the invention.

Having now described my invention what I claim as new and desire to secure by Letters Patent, is:

1. In means for supplying water to steam boilers, the combination of the boiler, a boiler feed pump, an electro-motor for operating the pump, an electric controller for controlling the electro-motor, and means controlled by the level of the water in the boiler for automatically operating the controller to energize the electro-motor when the water level is below the normal and to put the motor out of operation when the normal water level is reached, said means consisting of an expansion tube having one end connected with the boiler below the water level and the other end with the boiler at the normal water level, and devices directly operated by the expansion tube for controlling the operation of the electric controller consisting of a weight to put the controller out of operation, a lever operated by the expansive tube, and a connection from the lever to the weight for lifting the same.

2. In means for supplying water to steam boilers, the combination of the boiler, a boiler feed pump, an electro-motor for operating the pump, an electric controller for controlling the electro-motor and comprising self-contained spring actuated means for delivering electric current to and cutting it off from the electro-motor with rapidity and a lever for operating the spring actuated means, and thermostatically operated means controlled by the level of the water in the boiler for automatically bringing the controller lever to a condition whereby spring actuated means of the controller operates rapidly of itself to energize the electro-motor when the water level is below the normal, and means such as a weight controlled by the thermostatically operated means to bring the controller lever to the condition whereby the spring actuated means operates rapidly of itself to put the motor out of operation when the normal water level is reached.

3. In means for supplying water to steam boilers, the combination of a plurality of boilers, a high pressure feed water main, a power driven pump for forcing water into said main under pressure greater than the boiler pressures, an electro-motor to drive the pump, an electric controller for starting and stopping the electro-motor, means independent of the water pressure for operating the electric controller to start the electro-motor, means controlled by the pressure of water in the high pressure feed water main to operate the electric controller to stop the electro-motor, branch feed water pipes from the high pressure feed water main to each boiler, a valve in each branch pipe normally free to open by the pressure in the high pressure feed water main, power devices for each of the valves for normally holding them closed, and means for each boiler controlled by the level of the water in the boiler for removing the action of the power devices upon the valves whenever the level of the water falls materially below the normal level.

4. In means for supplying water to steam boilers, the combination of a plurality of boilers, a high pressure feed water main, a power driven pump for forcing water into said main under pressure greater than the boiler pressures, an electro-motor to drive the pump, an electric controller for starting and stopping the electro-motor, means for operating the electric controller to start the electro-motor, means controlled by the pressure of water in the high pressure feed water main to operate the electric controller to stop the electro-motor, branch feed water pipes from the high pressure feed water main to each boiler, a valve in each branch pipe normally free to open by the pressure in the high pressure feed water main, power devices for each of the valves for normally holding them closed, and means for each boiler controlled by the level of the water in the boiler for removing the action of the power devices upon the valves whenever the level of the water falls materially below the normal level, said means each comprising an expansion member subjected to the action of steam when the water is below the normal level and to water when it reaches the normal level or thereabout, and connecting devices between the expansion member and the power devices whereby the latter can only become effective when the level of the water in the boiler is at or above the normal level.

5. In means for supplying water to steam boilers, the combination of a plurality of boilers, a high pressure feed water main, a power driven pump for forcing water into said main under pressure greater than the boiler pressures, an electro-motor to drive the pump, an electric controller for starting and stopping the electro-motor, means consisting of a weighted device and a steam actuated device acting continuously for operating the electric controller to start the electro-motor, means controlled by the pressure of water in the high pressure feed water main to operate the electric controller to stop the electro-motor, branch feed water pipes from the high pressure feed water main to each boiler, a valve in each branch pipe normally free to open by the pressure in the high pressure feed water main, power devices for each of the valves for normally holding them closed, and means for each boiler controlled by the level of the water in the boiler for removing the action of the power devices upon the valves whenever the level of the water falls materially below the normal level.

6. In means for supplying feed water to boilers, the combination of a plurality of boilers, a high pressure water main, a power driven pump for forcing water into the main at a higher pressure than that in the boilers, an electro-motor for driving the pump, an electric controller for starting and stopping the motor, branch pipes from the water main to the respective boilers, valves in each of the branch pipes to control the flow of water therethrough, thermally acting means for each boiler operated by the changes in the level of the water in the respective boilers, means for each boiler directly operated by the thermally acting means of said boilers for controlling the respective valves in the respective branch pipes to admit water to the boilers when the water level is below the normal level, and devices controlled by any one or more of the thermally acting means of the plurality of boilers for operating the electric controller to start the electro-motor whenever the water level gets below the normal in any one or more of the boilers.

7. In means for supplying feed water to boilers, the combination of a plurality of boilers, a high pressure water main, a power driven pump for forcing water into the main at a higher pressure than that in the boilers, an electro-motor for driving the pump, an electric controller for starting and stopping the motor, branch pipes from the water main to the respective boilers, valves in each of the branch pipes to control the flow of water therethrough, thermally acting means for each boiler operated by the changes in the level of the water in the respective boilers, means for each boiler directly operated by the thermally acting means of said boilers for controlling the respective valves in the respective branch pipes to admit water to the boilers when the water level is below the normal level, and motor devices for operating the electric controller for starting the electro-motor and pump whenever water is admitted to any boiler by its branch pipe under the control of the thermally acting means of such boiler.

8. In means for supplying water to steam boilers, the combination of a plurality of steam boilers, a feed water pump, a main connected with the pump, an electro-motor to drive the pump, a controller for starting and stopping the electro-motor, means for operating the controller for normally putting the electro-motor out of operation, means controlled by the water level conditions of the boiler to put the controller into operation to start the motor, and separate means for each boiler controlled by the water level therein for regulating the supply of water from the main to the respective boilers and also to control the time of operation of the means for operating the controller to put the electro-motor into or out of operation, whereby the pump is put into operation simultaneously with the supply of feed water to any one of the plurality of boilers.

9. In means for supplying feed water to boilers, the combination of a plurality of boilers, a high pressure water main, a power driven pump for forcing water into the main at a higher pressure than that in the boilers, an electro-motor for driving the pump, an electric controller for starting and stopping the motor, branch pipes from the water main to the respective boilers, valves in each of the branch pipes to control the flow of water therethrough, automatically operated acting means for each boiler operated by the changes in the level of the water in the respective boilers, means for each boiler directly operated by the automatically acting means of said boilers for controlling the respective valves in the respective branch pipes to admit water to the boilers when the water level is below the normal level, and devices controlled by any one or more of the automatically acting means of the plurality of boilers for operating the electric controller to start the electro-motor whenever the water level gets below the normal in any one or more of the boilers.

10. In means for supplying feed water to boilers, the combination of a plurality of boilers, a high pressure water main, a power driven pump for forcing water into the main at a higher pressure than that in the boilers, an electro-motor for driving the pump, an electric controller for starting and stopping the motor having means for normally operating the controller to stop the motor, branch pipes from the water main to the respective boilers, valves in each of the branch pipes to control the flow of water therethrough, means for each boiler operated by the changes in the level of the water in the respective boilers, means for each boiler directly operated by the means of said boilers for controlling the respective valves in the respective branch pipes to admit water to the boilers when the water level is below the normal level, and motor devices for operating the electric controller for starting the electro-motor and pump whenever water is admitted to any boiler by its branch pipe under the control of the means of such boiler.

In testimony of which invention, I have hereunto set my hand.

EARL E. NORMAN.

Witnesses:
R. M. HUNTER,
R. M. KELLY.